United States Patent [19]

Fust et al.

[11] Patent Number: 4,573,810
[45] Date of Patent: Mar. 4, 1986

[54] SELF-PUMPING HYDRODYNAMIC BEARING

[75] Inventors: Armin Fust, Gebenstorf; Mihailo Starcevic, Mellingen, both of Switzerland

[73] Assignee: BBC Brown, Boveri & Co., Ltd., Baden, Switzerland

[21] Appl. No.: 640,840

[22] Filed: Aug. 15, 1984

[30] Foreign Application Priority Data

Aug. 31, 1983 [CH] Switzerland ............ 4776/83

[51] Int. Cl.$^4$ .............. F16C 1/24; F16C 3/14; F16C 32/06
[52] U.S. Cl. .................. 384/322; 308/5 R; 384/100; 417/320
[58] Field of Search ............... 384/100, 112, 113, 123, 384/313, 315, 316, 322, 321, 369, 398; 308/85 R, 5 R; 474/91; 417/320

[56] References Cited

U.S. PATENT DOCUMENTS

| 574,702 | 1/1897 | Bennett et al. | 417/320 |
| 2,006,951 | 7/1935 | Keller | 384/369 |
| 2,689,626 | 9/1954 | Peters | 308/5 R X |
| 3,137,530 | 6/1964 | Kohler | 308/5 R |
| 3,827,767 | 8/1974 | Sinner | 384/113 |

FOREIGN PATENT DOCUMENTS 1309765 10/1962 France ................. 384/100

Primary Examiner—Donald Watkins
Assistant Examiner—Lynn M. Sohacki
Attorney, Agent, or Firm—Oblon, Fisher, Spivak, McClelland & Maier

[57] ABSTRACT

In hydrodynamic bearings it is necessary for the lubricant leaving the lubricant film to be cooled. The self-sufficient, reliable operation of the system is only ensured if the transport of lubricant can be generated and maintained by the bearing itself. For this purpose the lubricant is taken from the contact surface of the moving component (2) into a pumping gap (13), recessed in the stationary component (4), which exhibits a strong constriction (17) in the direction of movement by a graduation (16). This pumping gap (13) may be machined directly in the contact surface of a bearing segment or in a separate component. A part of the lubricant stream which enters the pumping gap (13) is removed in front of the constriction (17) through an appropriate lubricant discharge duct (14). This branched lubricant stream (19) represents the delivery quantity of the pumping gap (13). The remainder of the branched lubricant stream flows on through the lubrication gap (18). The pumping pressure corresponds to the pressure built up hydrodynamically in the pumping gap (13).

17 Claims, 4 Drawing Figures

SELF-PUMPING HYDRODYNAMIC BEARING

The invention relates to a self-pumping hydrodynamic bearing comprising a moving component and at least one stationary component.

In hydrodynamic bearings it is necessary for the lubricant discharged from the lubricating film to be cooled.

In order to ensure easy access to the coolers for cleaning, repairs et cetera, they are advantageously not accommodated directly in the housing of the bearing. However, the external location of the coolers dictates that the lubricant must be pumped from the bearing surroundings to the coolers. Externally driven pumps are not always accepted for this purpose from considerations of reliability.

This self-sufficient reliable operation of the system is only ensured if the transport of lubricant can be generated and maintained by the bearing itself. It is known to generate the self-transport of the lubricant by utilising the centrifugal force of the race rotating in the lubricant bath.

For this purpose radial or quasi-radial bores are provided in the rotating race. This solution is characterised by the fact that the bores in the race do not touch the race/support bearing segment and race/guide bearing segment sliding surfaces.

Due to the centrifugal force, the lubricant is transported along the bore to the outside, where it is collected centrally and fed to the external cooling means. The transport due to centrifugal force causes a suction effect at the entry to the bores.

However, a great disadvantage of this solution lies in the fact that the suction effect remains unstable during operation, and this form of transport therefore does not provide adequate certainty of maintenance of the transport operation. This suction of the lubricant frequently presents problems, because it occurs in the region of the inner bearing diameter, that is to say, where the liquid level falls due to the rotation and foam is frequently produced, which then causes the transporting suction to collapse.

The invention seeks to provide a remedy here. The underlying aim of the invention, as characterised in the claims, is, in a self-pumping hydrodynamic bearing of the type initially stated, to make the tapping of the lubricant occur at a point in the system which already lies below the liquid level without particular measures.

In this case the lubricant is drawn by the moving contact surface into the pumping gap recessed in the stationary sliding surface, which exhibits a correspondingly great constriction in the movement direction by graduation. A part of the lubricant stream which enters the large gap is removed in front of the constriction by an appropriate lubricant discharge duct. This branched lubricant stream represents the delivery quantity of the pumping gap. The remainder of the lubricant stream flows on through the narrow lubrication gap.

Due to the geometry of the pumping gap, the pumping pressure which is built up hydrodynamically in the pumping gap can be varied over a wide range.

Furthermore, such a pump exhibits no sacrifice of transport capacity in the case of a high viscosity lubricant. Instead the pumping capacity increases in the case of a more viscous lubricant correspondingly to the higher pressure drop in the cooler and in the pipes.

A further advantage of the invention lies in the fact that the transport of the lubricant and the discharge of the latter occurs outside the moving component. Accordingly, particularly in the case of rotating races, no seal elements involving the acceptance of additional friction losses are necessary.

In a preferred embodiment of the invention, the pumping gaps are integrated into the radial or axial bearing segments.

In another preferred embodiment of the invention, the pumping gaps of a bearing segment or stationary component are arranged in mutual mirror image relationship, whereby the function of the pump its ensured for both directions of rotation of the machine.

In another preferred embodiment of the invention, the lubricant duct fitted in front of the constriction of the pumping gap is constructed inclined in the discharge direction, whereby the discharge is facilitated.

In another preferred embodiment of the invention, the moving component is constructed as an intermediate element to transmit the movement of a shaft rotating outside of the lubricant bath. The moving component thus travels in the lubricant bath through at least one pumping gap, whereby a transport of lubricant can be maintained.

Exemplary embodiments of the invention are illustrated diagrammatically in the drawing, wherein.

Figure 1:
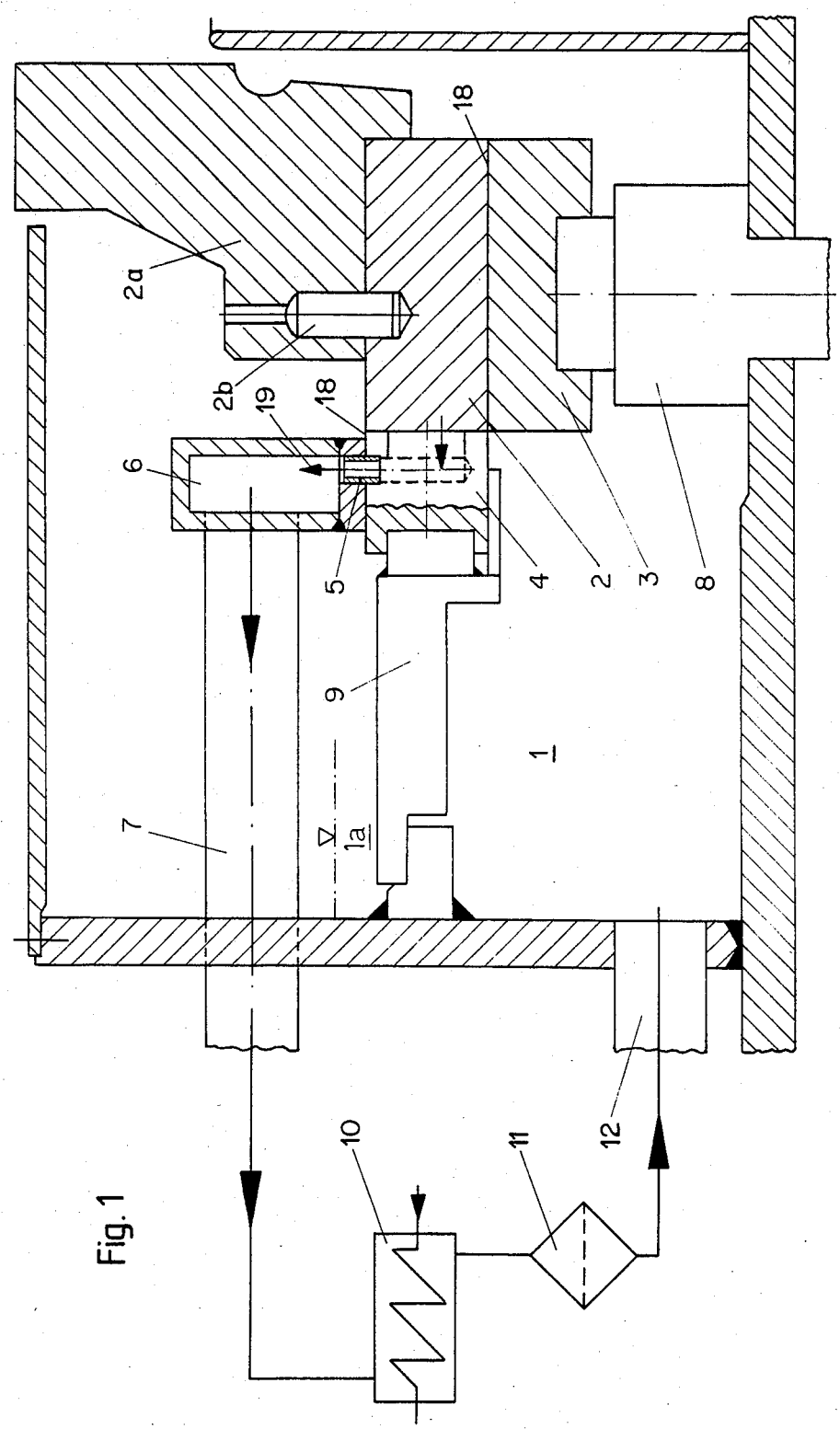
FIG. 1 shows a complete self-pumping hydrodynamic bearing, which is in this case a vertical version of a combined support bearing and guide bearing of a hydroelectric generator.

All the elements not necessary for the immediate understanding of the invention have been omitted. The flow direction of the lubricant is designated by a single arrow, but the direction of movement of the moving parts of a double arrow. In the various figures, identical elements are designated by the same reference numerals in each case.

FIG. 1 shows a vertical self-pumping hydrodynamic bearing. The moving component 2, which is a rotating race in this case, is supported in the circumferential direction by a plurality of stationary support bearing segments 3, which are in turn anchored upon a support 8. The flange 2a—this is a constituent of the machine rotor, not shown—is connected to the race 2 by means of a plurality of pins 2b. Obviously, other connection techniques may also be employed between race 2 and flange 2a. The race 2 is retained by a plurality of stationary components 4, which are guide bearing segments in this case. The lubricant 19 transported through the individual guide bearing segments 4 passes out of the interior of the segment via connecting pieces 5 into the collecting duct 6. From there it is passed through a pipe 7 to the cooler 10 and via a filter 11 through the pipe 12 back into the bearing housing 1. In order for the transport of the lubricant 19 not to collapse, it is important that the level of the lubricant bath 1a extends at least above the highest point of the lubrication gap 18 between race 2 and guide bearing segment 4. This desideratum is fulfilled for the bearing function in any case.

Figure 2:
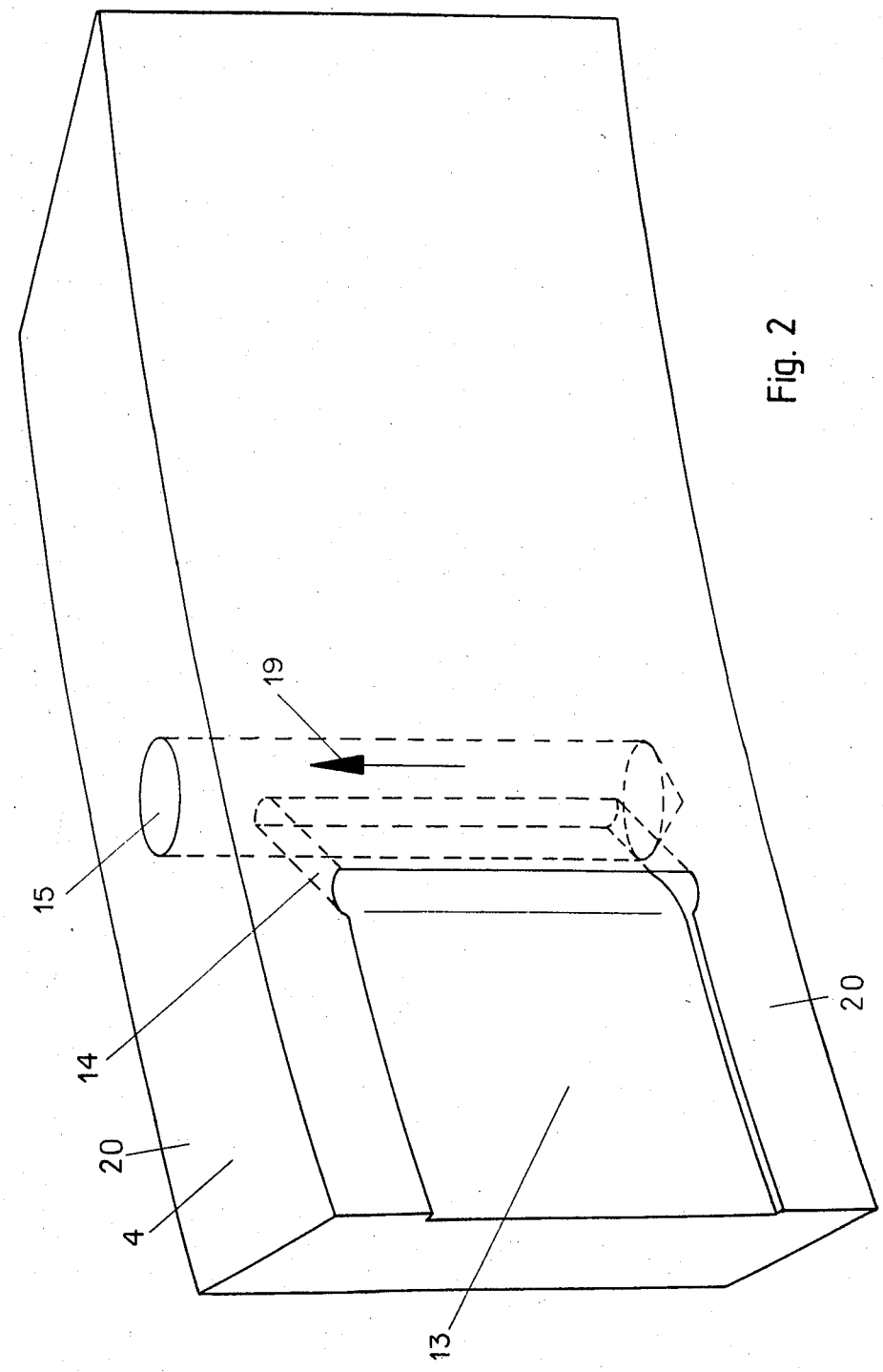
FIG. 2 shows a guide bearing segment with machined pumping gap.

FIG. 2 shows a guide bearing segment 4 having a machined pumping gap 13. The lubricant is pumped by the pumping gap 13 through a lubricant discharge duct 14 into an outflow bore 15. This duct 14 is constructed inclined in the discharge direction of the lubricant 19 in order to utilise the fluid impulse. From the outflow bore 15, the transported lubricant 19 is removed by the guide bearing segment 4. The discharge transversely to the direction of movement is restricted by laterally fitted edge bars 20, the interval of which from the rotating race 2 is reduced to lubrication gap height 18 (see FIG. 3).

The pumping gap 13, which may have any structural configuration, may also be provided in a separate component on the moving sliding surface, or it may, as FIG. 2 shows, be machined directly in a guide bearing segment 4 which is present in any case at the start of the sliding surface. Likewise, any course of the graduation 16 of the pumping gap height 13a in the direction of movement is possible. The application may be made for any desired bearing geometries (axial bearing, radial bearing): for two directions of rotation, the pumping gap 13, including the lubricant discharge channel 14 and outflow bore 15, may be fitted on both sides of the contact surface of the guide bearing segment 4.

Figure 3:
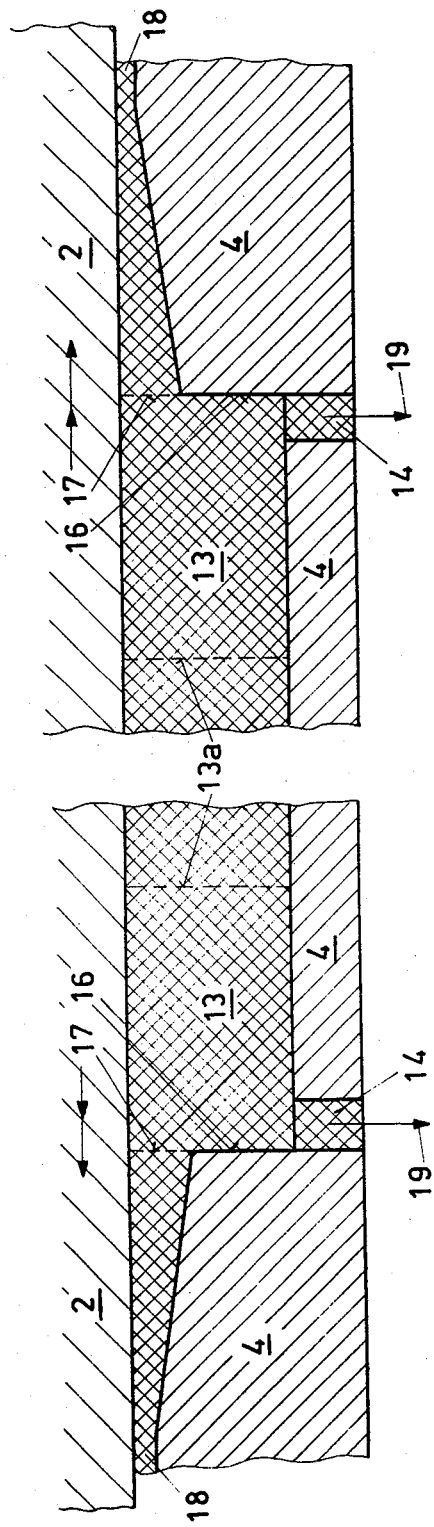
FIG. 3 shows the geometrical construction of a pumping gap.

FIG. 3 shows how the transport effect is generated at the moving sliding surface. The lubricant is drawn by the moving contact surface of the race 2 into a pumping gap 13, which exhibits a strong constriction 17 of the pump gap height 13a in the direction of movement by a graduation 16. A part of the lubricant stream, which enters the gap 13, is removed in front of the constriction 17 through an appropriate lubricant discharge channel 14. This branched lubricant stream 19 represents the delivery quantity of the pumping gap 13. The remainder of the branched lubricant stream flows on through the lubrication gap 18 between race 2 and guide bearing segment 4. The pumping pressure corresponds to the pressure built up hydrodynamically in the gap 13, and can be controlled by the length and height of the pumping gap 13.

Figure 4:
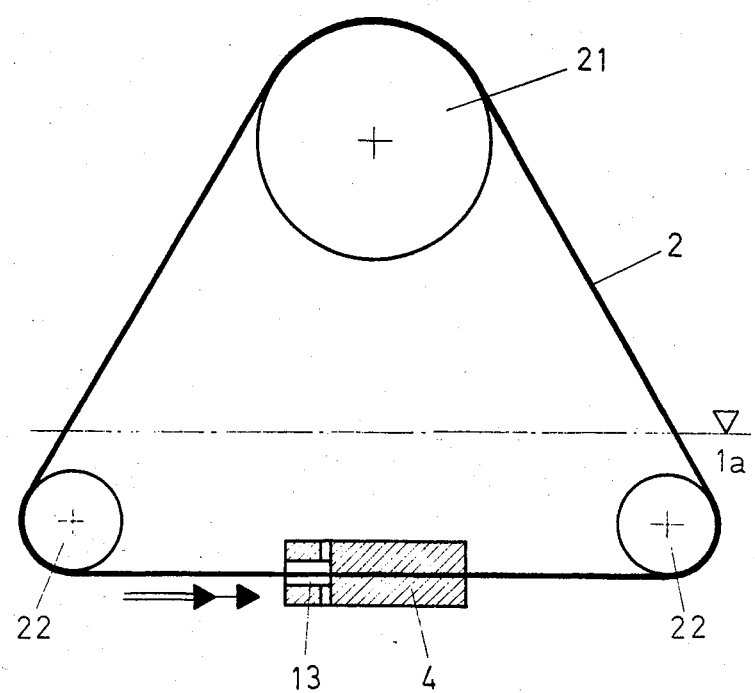
FIG. 4 shows a possibility of application of the pumping gap for a shaft rotating outside the lubricant bath.

FIG. 4 shows a possibility of application of the self-pumping lubricant transport making use of the above-described pumping gap 13. The moving component 2 in this case is a belt. Obviously, other drive transmission aids are also possible. The belt 2 is driven by the shaft 21 and guided by pulleys 22 which are immersed in a lubricant bath 1a. The stationary component 4 with the machined pumping gaps 13 is likewise immersed there. The belt 2 travels through the pumping gap 13 immersed in the lubricant, whereby the desired self-pumping transport of lubricant is generated, which may be utilised to lubricate the bearings of the rotating shaft 21 and optionally of other machine parts.

We claim:

1. A self-pumping hydrodynamic bearing comprising:
   (a) a moving component which slides on a sliding surface of at least one stationary component, the sliding surface of the stationary component being provided with at least one pumping gap in the form of a recess in the sliding surface of the stationary component bounded by a constriction of the pumping gap height in the direction of movement of the moving component, said constriction comprising:
      (i) an abrupt shoulder at the downstream boundary of said pumping gap, the working surface of said abrupt shoulder being at least generally perpendicular to the flow of the lubricant through said pumping gap, and
      (ii) a gradually inclined ramp connecting said abrupt shoulder to said lubrication gap, and
   (b) a lubricant discharge duct communicating with the pumping gap upstream of the constriction.

2. A self-pumping hydrodynamic bearing according to claim 1, wherein the pumping gap is bounded laterally by edge bars, the interval of which from the moving part is the same as the lubrication gap size.

3. A self-pumping hydrodynamic bearing according to claim 1, wherein the at least one stationary component is a bearing segment and the moving component is a bearing contact surface.

4. A self-pumping hydrodynamic bearing according to claim 1, wherein the sliding surface of the stationary component is provided with two pumping gaps which are arranged in mutual mirror image relationship.

5. A self-pumping hydrodynamic bearing according to claim 1, wherein the lubricant discharge duct is inclined in the discharge direction.

6. A self-pumping hydrodynamic bearing according to claim 1, wherein the moving component is constructed as an intermediate element for the transmission of the rotary movement of a shaft rotating outside a lubricant bath and the moving component travels around the shaft outside the lubricant bath, then through the lubricant bath, then through the pumping gap.

7. A self-pumping hydrodynamic bearing comprising:
   (a) at least one stationary component having a sliding surface;
   (b) a moving component which slides on the sliding surface of said at least one stationary component and which is separated from the sliding surface of said at least one stationary component by a lubrication gap through which lubricant flows during use of the self-pumping hydrodynamic bearing; and
   (c) a lubricant discharge duct;
   (d) the sliding surface of said at least one stationary component being sized, shaped, and positioned relative to said moving component to provide a pumping gap therebetween through which, during the use of the self-pumping hydrodynamic bearing, lubricant is forced in the direction of motion of said moving component;
   (e) said pumping gap being bounded a constriction which divides the flow of lubricant into at least two branches, at least one of which continues into said lubrication gap and at least one of which enters said lubricant discharge duct;
   (f) said constriction comprising:
      (i) an abrupt shoulder at the downstream boundary of said pumping gap, the working surface of said abrupt shoulder being at least generally perpendicular to the flow of the lubricant through said pumping gap, and
      (ii) a gradually inclined ramp connecting said abrupt shoulder to said lubrication gap.

8. A self-pumping hydrodynamic bearing as recited in claim 7 and further comprising a lubricant cooler operatively connected to said lubricant discharge duct.

9. A self-pumping hydrodynamic bearing as recited in claim 7 wherein said pumping gap is bounded laterally by edge bars.

10. A self-pumping hydrodynamic bearing as recited in claim 7 wherein said at least one stationary component is a bearing segment and said moving component is a bearing contact surface.

11. A self-pumping hydrodynamic bearing as recited in claim 7 wherein the sliding surface of said at least one stationary component is sized, shaped, and positioned relative to said moving surface to provide two pumping gaps therebetween, each of said two pumping gaps being bounded by a constriction, said two constrictions being oppositely directed, whereby one of said constrictions causes lubricant to enter said lubricant discharge duct when said moving component is moving in one direction and the other of said constrictions causes lubricant to enter said lubricant discharge duct when said moving component is moving in the other direction.

12. A self-pumping hydrodynamic bearing as recited in claim 7 wherein said pumping gap is bounded by two oppositely directed constrictions, whereby one of said constrictions causes lubricant to enter said lubricant discharge duct when said moving component is moving in one direction and the other of said constrictions causes lubricant to enter said lubricant discharge duct when said moving component is moving in the other direction.

13. A self-pumping hydrodynamic bearing as recited in claim 7 wherein said lubricant discharge duct is inclined in the direction of the movement of lubricant through said pumping gap.

14. A self-pumping hydrodynamic bearing as recited in claim 7 wherein:
  (a) said moving component is an intermediate element for the transmission of the rotary motion of a shaft which rotates outside a lubcirant bath;
  (b) said pumping gap is in fluid communication with said lubricant bath; and
  (c) said moving component travels around said shaft outside said lubricant bath, then through said lubricant bath, and then into said pumping gap.

15. A self-pumping hydrodynamic bearing according to claim 1, wherein, in use, the pumping gap communicates with a lubricant bath the surface level of which is above the pumping gap, whereby the lubricant gap is constantly replenished by hydrostatic pressure.

16. A self-pumping hydrodynamic bearing as recited in claim 7 wherein, during use of the selfpumping hydrodynamic bearing, said pumping gap communicates with a lubricant bath the surface level of which is above said pumping gap, whereby the lubricant in said pumping gap is constantly replenished by hydrostatic pressure.

17. A self-pumping hydrodynamic bearing as recited in claim 7 wherein said at least one stationary component is composed of a plurality of stationary bearing segments.

* * * * *